(No Model.)

M. L. AKERS.
HARROW.

No. 577,476. Patented Feb. 23, 1897.

Witnesses
T. M. Johnson
J. N. Syggert

Inventor
Maurice L. Akers
By his Attorneys,
C. A. Snow & Co.

UNITED STATES PATENT OFFICE.

MAURICE LEONARD AKERS, OF GOOSEBERRY, OREGON, ASSIGNOR OF TWO-THIRDS TO ROGER MONTGOMERY, OF HARDMAN, AND ALVEN SPENCER AKERS, OF HEPPNER, OREGON.

HARROW.

SPECIFICATION forming part of Letters Patent No. 577,476, dated February 23, 1897.

Application filed September 29, 1894. Serial No. 524,509. (No model.)

*To all whom it may concern:*

Be it known that I, MAURICE LEONARD AKERS, a citizen of the United States, residing at Gooseberry, in the county of Morrow and State of Oregon, have invented a new and useful Harrow, of which the following is a specification.

This invention relates to that class of agricultural implements for cultivating and preparing the land to insure a healthy and sturdy growth of grain, plants, &c., and which comprise curved spring-teeth and rocking bars carrying the teeth and adapted to be turned in their bearings to depress the teeth into the soil to a greater or less distance, according to the required depth of cultivation, or to bring the curved portions of the teeth in contact with the ground to serve as runners upon which the implement may glide as it is drawn over the field.

The principal object of the invention is to construct the teeth and dispose them with relation to the rocking bars so that a stanch arrangement will result when the curved or runner portions of the teeth are in contact with the ground and the shape of the teeth be preserved, said teeth having substantially straight arms radiating from the center or axis of the rocking bars and occupying a nearly perpendicular position when the runner portions are trailing upon the ground, thereby bracing and strengthening the said runner parts. The attaching ends of the radiating and bracing arms are curved forward and secured to the rocking bars, so as to enable the end thrust of the arms to be received against the lower side of the bars when the implement is skidding over the ground, thereby relieving the fastenings between the teeth and the rocking bars of the greater part of the strain.

Various other objects and advantages are sought to be attained, and will be apparent as the nature of the invention is unfolded; and to this end the improvement consists of certain details of construction and novel combinations of the parts, which hereinafter will be more fully described, illustrated, and claimed.

Figure 1:
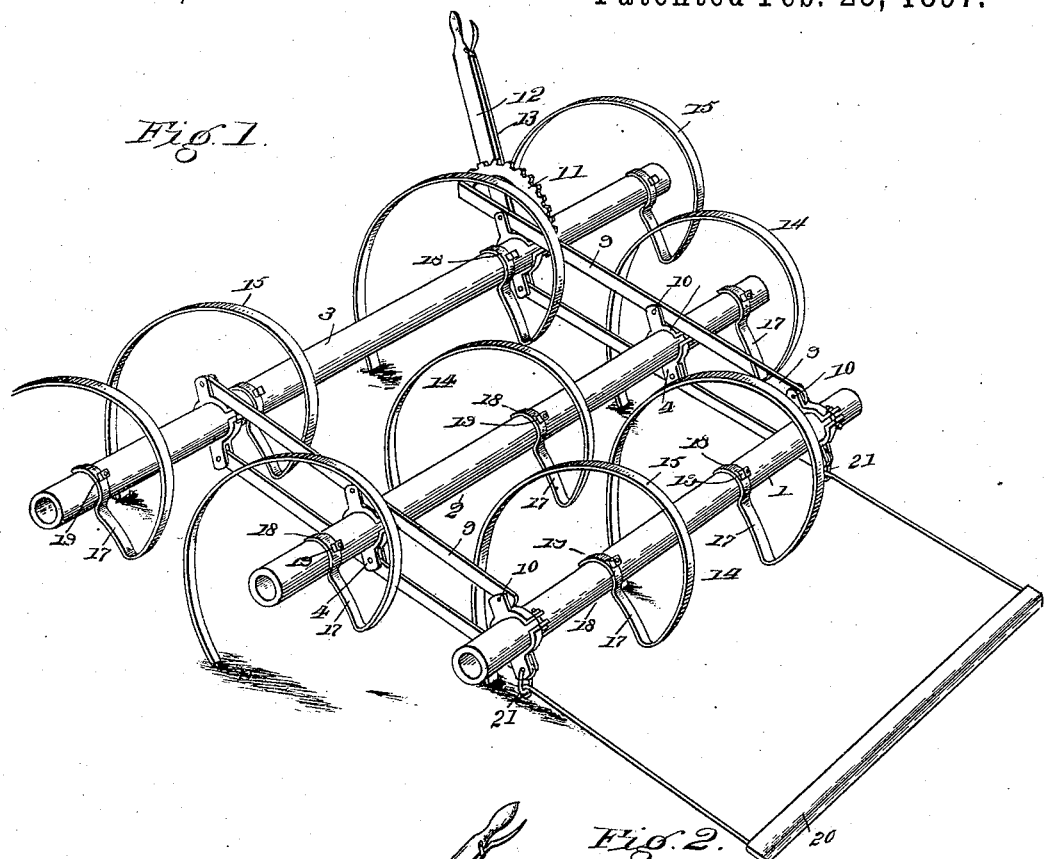
Figure 2:
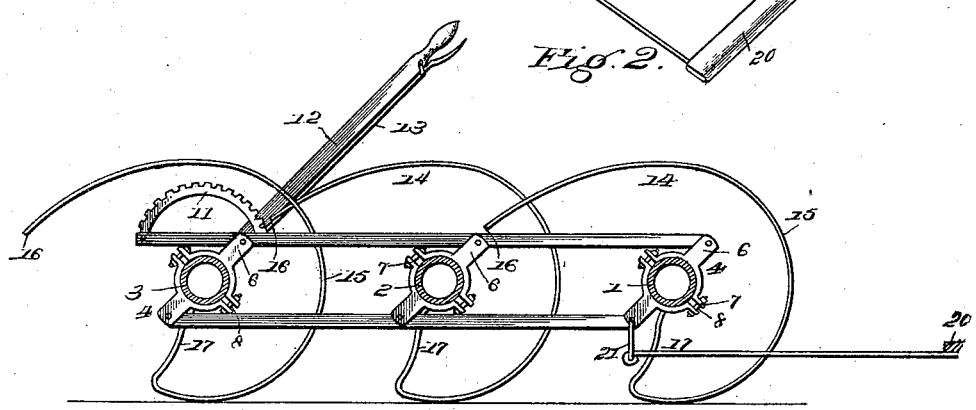
Figure 3:
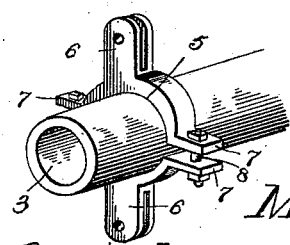

Referring to the drawings, Figure 1 is a perspective view of an implement constructed in accordance with this invention, the same being shown in position for operation as a harrow. Fig. 2 is a longitudinal sectional view thereof, the connecting-bars being shown in elevation and the teeth in the position they assume when serving as runners. Fig. 3 is a detail perspective view of a portion of a rocking bar and the yokes clamped thereon.

Similar and corresponding parts are referred to in the subjoined description and indicated in the several views of the accompanying drawings by the same reference-characters.

The implement is illustrated as consisting of but one section, although it will be understood that a series of sections may be comprised in a single implement or harrow, if so desired. This section consists of a series of transversely-disposed parallel rocking bars 1, 2, and 3, which are preferably formed of gas-pipe of any suitable gage and progressively varying in length from front to rear.

Each of the rocking bars is supplied with pairs of yokes 4, secured thereon. The yokes 4 are preferably cast and comprise a central curved or semicircular portion 5 and an outstanding lug 6 midway of the yoke and cleft at its outer end, each yoke having its ends 7 bent outward and apertured to receive bolts 8, by means of which the pairs of yokes are connected together. When the yokes are assembled and clamped about the rocking bars, the lugs 6 will come upon opposite sides of the rocking bars and aline. Each rocking bar has a pair of yokes clamped thereto near its ends, and the lugs of the several yokes will come above and below the plane of the rocking bars, so as to receive the upper and the lower parallel bars 9, the latter being seated in the cleft ends of the lugs and having pivotal connection therewith. The corresponding yokes are in longitudinal alinement to obviate any binding action between the lugs and the bars 9, pivotally connected therewith.

The rear rocking bar at the left side of the machine, which when two harrow-sections are employed together will be the inner side, so as to bring both of the hereinafter-described levers together, is provided with a segmentally-toothed locking-standard 11, and secured rigidly to the adjacent yoke at the side of said standard upon the rear rocking bar 3 is a hand-lever 12, which may be swung to the front or rear, thus rocking the entire series of bars 1, 2, and 3. A hand-latch 13 is secured to the hand-lever and engages at its lower end with the teeth of the aforesaid segmental locking-standard to hold the rocking bars in the located position.

At intervals upon each rocking bar, and so arranged as to be out of alinement with each other, are located spring-teeth 14. Each spring-tooth 14 comprises a curved portion 15, which extends for about three-quarters of a circle and finally terminates in a harrow-point 16. The opposite terminal of the curved portion of the tooth ends abruptly and is bent to form a radially-disposed and substantially straight arm 17, which extends to the center of the space encircled by the tooth and terminates in a curved or semicircular attaching plate or clip 18, designed to conform to the contour of the rocking bar. This attaching plate or clip 18 is perforated, and a bolt 19 extends therethrough and enters the rocking bar and is the means whereby the tooth is held in position. This plate 18 curves forwardly and is fitted to the front side of the rocking bar, thereby causing the strain to extend in the same direction throughout the length of the plate and the arm. Moreover, by curving the terminal portion 18 the end of the arm 17 bears against the under side of the rocking bar when the runner portion of the tooth is skidding upon the ground, and the end thrust is received squarely by the rocking bar in the plane of its axis and the fastening-bolt relieved in a measure of the load and transverse strain, which would be liable under a different arrangement to shear the bolt.

It will be observed that when the rocking bar is turned in one direction, namely, rearward, the tooth portion 16 is brought into contact with the soil, and, on the other hand, by turning the rocking bar in the opposite direction, or forward, the tooth portion is lifted out of contact with the soil and the curved portion 15 is lowered to the ground to support the harrow and serve as a runner. When the runner portion is trailing upon the ground, the radial arm 17 will occupy a nearly perpendicular position (being inclined slightly forward toward its upper end) and will brace the runner, which is that portion of the tooth adjacent to the arm. This is clearly indicated in Fig. 2.

Any suitable draft device may be employed in connection with the harrow, but in the present instance one is shown and is a simple means, consisting of a transverse draft-bar 20, of suitable length, preferably, to agree with the front rocking bar, but where a series of sections are employed of course the said draft-bar will be increased in length, so as to extend across the series. Draft-rings 21, pivotally connecting the front ends of the lower bars 9 with the lugs of the lower front yokes, are connected by means of draft chains or rods 22 with the aforesaid draft-bar 21. By this application of the draft the latter tends to force the rear or working ends of the teeth downward into the soil when the lever 12 is released, thereby dispensing with the application of manual effort to attain this end.

If a stump, boulder, or other obstruction should be met with, the lever is thrown forward, thus withdrawing the working ends of the teeth and bringing the runner portions in contact with the ground, as shown in Fig. 2, whereby the harrow may ride thereover without serious injury. This is the position of the teeth when the implement or harrow is being transported from one field or place to another, thus obviating the necessity of employing other runners.

It will be seen that the teeth may be locked in any position desired by the latch 13, lever 12, and standard, and that by a single movement of the lever the teeth are adjusted simultaneously and to the same degree.

It will be seen that the teeth of the two front bars terminate sufficiently close to the bars immediately in rear thereof to cause the latter to serve to positively disengage any trash that may have accumulated upon the teeth in advance thereof.

Having thus described the invention, what is claimed as new is—

A harrow having rocking bars, curved spring-teeth provided with runner portions, adapted to be disposed to support the harrow, and substantially straight arms springing from the heels of the runner portions and extending inwardly approximately to the centers of the spaces inclosed by the teeth, and terminating in clips secured to the rocking bars, said arms extending radially from the axes of the rocking bars and being adapted when the extremities of the teeth are in operative position to incline downwardly and forwardly from the rocking bars, and when the runner portions are in operative position to incline downwardly and rearwardly from the rocking bars, connections between the rocking bars, and means for securing said rocking bars at the desired adjustment, substantially as specified.

In testimony that I claim the foregoing as my own I have hereto affixed my signature in the presence of two witnesses.

MAURICE LEONARD AKERS.

Witnesses:
J. A. WOOLING,
J. W. MORROW.